E. M. SALLUST.
SEED CORN HANGER.
APPLICATION FILED JAN. 27, 1917.
1,312,271.
Patented Aug. 5, 1919.
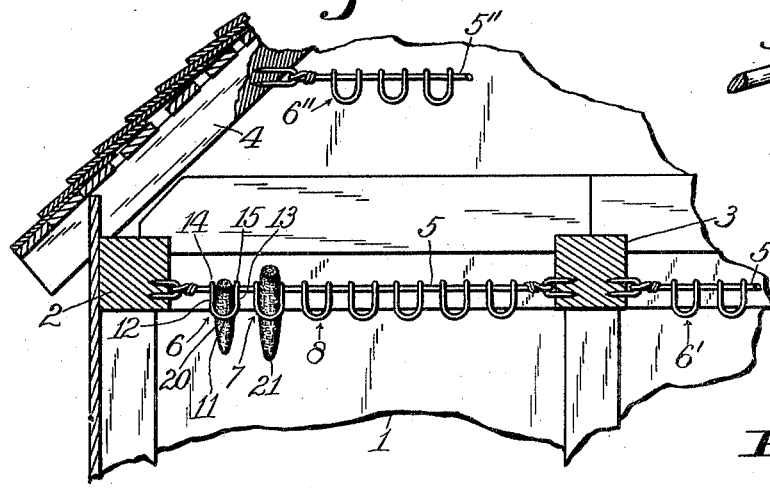
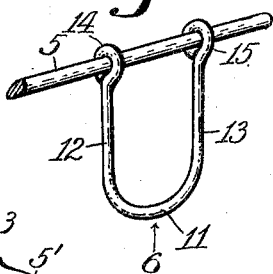
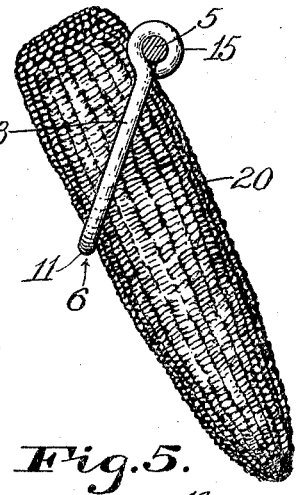
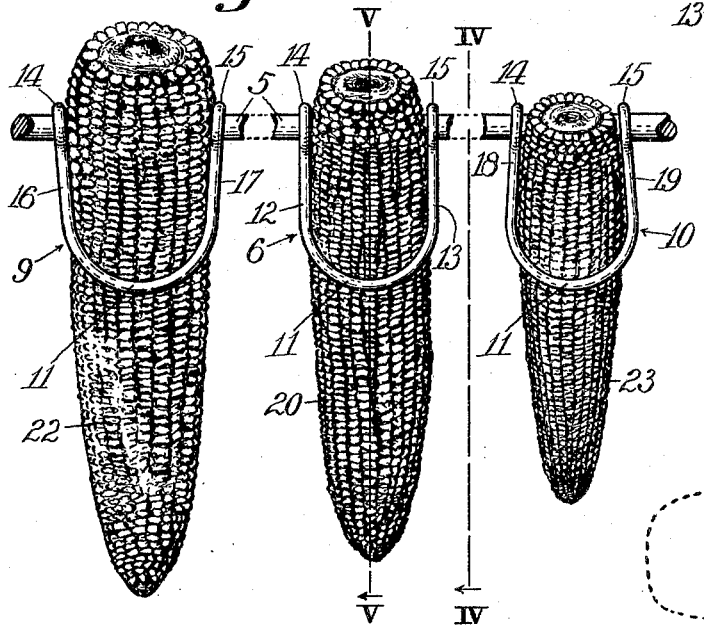
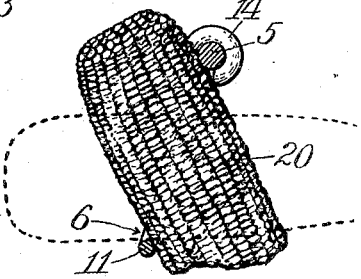
WITNESSES:
J. H. Gardner.
Myrtle Mc Coy.
INVENTOR:
Ernest M. Sallust,
BY
E. T. Silvius,
ATTORNEY.

UNITED STATES PATENT OFFICE.

ERNEST M. SALLUST, OF WAYNE TOWNSHIP, OWEN COUNTY, INDIANA.

SEED-CORN HANGER.

1,312,271.  Specification of Letters Patent.  Patented Aug. 5, 1919.

Application filed January 27, 1917. Serial No. 144,984.

*To all whom it may concern:*

Be it known that I, ERNEST M. SALLUST, a citizen of the United States, residing in Wayne township, in the county of Owen and State of Indiana, have invented a new and useful Seed-Corn Hanger, of which the following is a specification, reference being had to the accompanying drawings and to the letters and figures of reference marked thereon.

This invention relates to appliances that are designed to be used for hanging ears of corn or maize separately in buildings, where the corn may be dried on the cob and preserved in proper condition for future use as seed corn, and at the same time be protected against the ravages of rats, mice and other animals, the invention having reference more particularly to devices for directly supporting the ears of corn.

An object of the invention is to provide seed corn hangers of such construction as to permit the ears of corn to be easily and expeditiously placed in the required position for preservation and which will permit the ears to be readily taken down when required for use. Another object is to provide an improved seed corn hanger that shall be so constructed as to be always ready for use and not require the attachment of any hanging device to the ears or corn cobs.

With the above-mentioned and other objects in view, the invention consists in a seed corn hanger having a multiplicity of devices into which ears of corn may be readily inserted and retained and which may be readily adjusted to various sizes of ears of corn without requiring tools or implements in effecting adjustment. The invention consists also further in the parts and combinations and arrangements of parts as hereinafter particularly described and further defined in the accompanying claims.

Referring to the drawings,—Figure 1 is a fragmentary vertical sectional elevation of a building provided with the improved seed corn hangers; Fig. 2 is a perspective view of a portion of the improved hanger designed for supporting one ear of corn; Fig. 3 is an elevation of the improved seed corn hanger having ears of corn supported thereby; Fig. 4 is a side view of one of the ears of corn arranged in a hanger as appearing on the line IV—IV on Fig. 3; and, Fig. 5 is a fragmentary side view of the ear of corn and its hanger taken on the line V—V on Fig. 3.

Similar reference characters on the different figures of the drawings indicate corresponding elements or features herein referred to.

In the drawings the numeral 1 indicates a suitable building having cap plates 2 and 3 and roof timbers 4. The improved seed corn hanger is suitably supported where the corn may hang without being in the way of various operations that may be conducted in the building and comprises a suitable number of metallic rods 5, 5', 5'', each rod being stretched between two points and suitably supported, as by means of the cap plates 2 and 3 or the roof timbers. Each rod contains a suitable number of hanger devices 6, 7, 8, or 6' or 6''. Each rod is approximately horizontal and the hanger devices are arranged thereon as closely as they may be without interfering one with another, there usually being some devices, as 9 and 10 that are slightly modified as to relative shape. Each hanger device is approximately U-shaped, each having a curved supporting portion 11 from which straight suspension rods 12 and 13 extend in approximately parallel arrangement, the suspension rods having connecting-eyes 14 and 15 respectively that embrace the rod 5, the connections being such as to be non-detachable but to permit the device to swing or to be moved along the rod 5 without being so loose thereon as to be wabbly. Each device is composed of pliable wire so that it may be re-shaped and retain its shape, in order that each device may be quickly re-shaped by hand to accommodate such size of ear as may be brought to it to be hung up. In such case the device has straight suspension rods 16 and 17 that extend divergently from the curved portion 11 to receive a relatively larger ear, and in other cases the device has suspension rods 18 and 19 that extend convergently from the curved portion 11 so as to closely embrace a relatively smaller ear than the average size. The normally shaped device receives the average size of ears 20 and 21, the devices that have the suspension arms slightly spread apart receiving the larger ears 22, the devices that have the suspension arms drawn slightly inward closely embracing the smaller ears 23.

In practical use the ears of corn are inserted in the hanger device in approximately horizontal position as indicated by dotted lines in Fig. 5 until the ear is nearly through the device with the thicker portion of the ear on the curved supporting portion 11, after which the ear is tilted so as to bring the thicker end of the ear upward against the under portion of the rod 5, the ear then being held at an inclination with the smaller end of the ear downward and the greater portion of the length of the ear below the point of contact with the portion 11, so that the force of gravity tends to cause frictional contact of the ear with the portion 11 and the rod 5 and prevents the ear from slipping downward from its position, the weight of the ear causing the device to swing backward slightly on the rod 5, approximately as indicated in Fig. 4. In case an inordinately large ear 22 is found the eyes 14 and 15 are readily drawn each away from the other along the rod 5 until the device is opened sufficiently to conveniently receive the ear, and in case a considerably smaller ear 23 is found the eyes 14 and 15 are readily pressed by hand each toward the other so as to bring the suspension arms sufficiently close to the sides of the ear to prevent the latter from being wabbly and liable to become accidentally knocked out of the device. Having hung up all the seed corn desired, it will be seen that the corn may be inspected from time to time without difficulty and may be readily turned or shifted in the hanger devices; and when finally taken down for use it will be apparent that the hangers will remain in position and not be liable to become misplaced or lost but will be found in readiness for use when again required.

Having thus described the invention, what is claimed as new is—

1. A seed-corn hanger comprising a horizontal rod, and hanger devices for corn ears having suspension rods that are adjustable each toward or from the other on and in connection with the horizontal rod to freely receive the ears between a pair of the suspension rods, each pair having a supporting member connected thereto and spaced apart from the suspension rod to freely receive the ear, the suspension rods of each device being adapted to receive ears of different sizes between them and to permit the ear to freely tilt on the supporting member into contact with the horizontal rod.

2. In a seed-corn hanger, the combination with a horizontal rod, of a plurality of hanger devices composed of flexible wire, each device comprising a supporting member and two approximately straight suspension rods permanently connected to the horizontal rod, the suspension rods of each device being adjustable each toward or from the other on the horizontal rod to freely receive different sizes of ears between them and permit the ear to freely tilt on the supporting member into contact with the horizontal rod, the suspension rods of some of said devices extending divergently each to the other from the supporting member.

In testimony whereof, I affix my signature in presence of two witnesses.

ERNEST M. SALLUST.

Witnesses:
JOSEPH P. WHITAKER,
E. F. GRAY.